UNITED STATES PATENT OFFICE.

WILLIAM B. CHISOLM, OF CHARLESTON, SOUTH CAROLINA.

PRESERVING WOOD.

955,762.

Specification of Letters Patent. Patented Apr. 19, 1910.

No Drawing.

Application filed February 16, 1909. Serial No. 478,237.

*To all whom it may concern:*

Be it known that I, WILLIAM B. CHISOLM, a citizen of the United States, residing at Charleston, county of Charleston, and State of South Carolina, have invented certain new and useful Improvements in Preserving Wood; and I do hereby declare the following to be a full, clear, and exact description of the invention, such as will enable others skilled in the art to which it appertains to make and use the same.

The object of my invention is to protect wood from the attacks of vegetable, fungoid and microbe organisms and of destructive insects and animalcula, and the like, by impregnating it with an aqueous solution carrying sulfur in such a form as to deposit free sulfur within the pores of the wood. It is based upon the discovery made by me that when wood is impregnated with a hot aqueous solution obtained by boiling together water, lime and sulfur, there is deposited free sulfur in and throughout the pores of the wood and also combined sulfur, which latter, likewise deposited in the pores of the wood is itself gradually converted in part into free sulfur. I have also ascertained that the hot solution has high capillary activity, enabling it to readily penetrate into the pores of the denser portions of the wood, so that the function of the deposit as a fungicide and germicide is realized to corresponding advantage.

In the preferred practice of my invention, I prepare the solution to be employed for the impregnation of the wood by boiling in water a mixture of four parts, by weight, of sulfur (as, for instance, flowers of sulfur, or crushed or ground rock sulfur) and one part of lime (preferably unslaked calcic oxid). When the liquid attains a temperature of about seventy (70) degrees Fahrenheit, it takes on the color of a light orange red, and this color gradually deepens to an almost claret red during the boiling operation, which is continued until that color is fully attained. Thereupon the solution is separated from the residue, by means of siphoning, decantation or filtration, and the wood is preferably immediately impregnated with the solution at about the boiling point; as I have found that if the temperature is permitted to notably fall some of the sulfur has a tendency to separate out from it, which is undesirable for the reason that the purposes of the invention are best subserved by permitting the solution to carry with it into the pores of the wood as large a proportion of sulfur as it will retain or carry. Moreover I have discovered that this tendency of some of the sulfur to separate out from the solution when the temperature is lowered can be turned to particular advantage in the practice of my invention, for the reason that as the wood is preferably impregnated with the solution at or near the boiling point, it will follow that when the wood so impregnated is removed from the treating vessels and permitted to cool, free sulfur will be deposited from the solution and into the open pores and vesicles of the wood, impregnating them with solid matter (sulfur and compounds of lime) which, to a great extent, prevents the possibility of decay, it being well known that decay commences in these open vesicles and more porous portions. The impregnation of the wood may be performed by any of the usual methods, such as those employing vacuum or pressure. I have also found that to a large extent, decay in the wood treated can be prevented by merely impregnating the sap portions and the more porous portions with the solution, even when the heart portions are not fully impregnated. For certain classes of work this will be found a sufficient treatment and I therefore do not desire to limit myself, in the practice of the invention to the thorough impregnation of all portions of the wood, heart as well as sap. In fact, the sap portion of wood is much more inclined to rot than the heart portion and is much more porous, containing more open vessels than the heart portion, so that almost all rot, from whatever source, starts in the sap portion, for which reason, if this sap portion is thoroughly filled or saturated with such a powerful germicide and fungicide as sulfur, it is almost impossible for any of the deleterious organisms to initiate decay.

The relative proportions of the firmly combined sulfur (calcium sulfid) and of the sulfur otherwise present in the solution will vary in accordance with its temperature,— the higher the temperature, the greater the capacity of the solution to carry additional sulfur, so that at or near the boiling point this carrying capacity is at its maximum.

In some instances, instead of lime, I may employ with the rock sulfur or flowers of sulfur of the original mixture, a suitable oxid, hydrate or salt of an alkaline earth metal, or of an alkali such as sodium, potassium or ammonium, which, I have ascertained, will likewise, upon boiling, give a solution appropriate for the main purposes of my invention; but, in most cases, I prefer to employ lime as the alkali for producing the sulfur solution, on account of its cheapness and convenience, and because the calcium salts in themselves have preservative effects and are less inclined to deliquesce than the corresponding compounds of sodium, potassium or ammonium.

To prevent the leaching out of the impregnated sulfur from the surface of the wood treated, in those instances where it is employed under water, (as, for instance, in the construction of wooden piers, piles and the like), I prefer, after impregnating the wood to the extent desired with the aqueous solution of combined and uncombined sulfur, to then give it a surface coating produced by bringing to fusion a mixture of unslaked lime and sulfur in substantially the proportions, by weight, of one part of lime to four parts of sulfur according to the precess of my Patent No. 802,680, thereby hardening the lumber and filling its surface pores and preventing the leaching out of any of the soluble sulfur with which the wood has been impregnated and thereby absolutely preventing any attack whatever upon the wood by the teredo worm, white ants, or any of the low animal organisms.

In another and co-pending application Serial No. 513,039, filed August 16, 1909, I have described and claimed a modified process wherein an excess of alkali is employed, this excess of alkali being sufficient to produce chemical changes in some of the wood constituents.

Having thus described my invention, what I claim is:—

1. The method of treating wood which consists in impregnating its pores with an aqueous solution carrying an excess of dissolved sulfur in such a form as to deposit finely divided free sulfur within the pores.

2. The method of treating wood which consists in impregnating its pores with an aqueous solution, containing sulfur in such form as to be at once deposited as such within the pores of the wood, and also containing combined sulfur in such a condition that after the impregnation of the pores of the wood it will be gradually converted in part into finely divided free sulfur.

3. The method of treating wood which consists in impregnating it with a hot solution of a calcium sulfid, said solution carrying sufficient additional sulfur to cause its color to be a clear claret red.

4. The method of treating wood which consists in impregnating it with a hot solution of a calcium sulfid, said solution containing sufficient additional sulfur to cause its color to be a clear claret red, such impregnation being carried on at substantially a boiling temperature.

5. As a new article of manufacture, wood impregnated with an alkaline sulfid and also carrying intimately distributed particles of free sulfur in the pores of its mass.

6. As a new article of manufacture, wood impregnated with a calcium sulfid and also carrying intimately distributed particles of free sulfur in the pores of its mass.

In testimony whereof I affix my signature, in presence of two witnesses.

WILLIAM B. CHISOLM.

Witnesses:
CHAS. S. BRYAN,
JOHN C. PENNIE.